United States Patent
Skärby et al.

(10) Patent No.: US 11,395,318 B2
(45) Date of Patent: Jul. 19, 2022

(54) METHOD AND RADIO NETWORK NODE FOR SCHEDULING DATA IN CONTROL REGION

(71) Applicant: Telefonaktiebolaget LM Ericsson (publ), Stockholm (SE)

(72) Inventors: Christian Skärby, Stockholm (SE); Carola Faronius, Järfälla (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 140 days.

(21) Appl. No.: 16/954,604

(22) PCT Filed: Jan. 12, 2018

(86) PCT No.: PCT/SE2018/050024
§ 371 (c)(1),
(2) Date: Jun. 17, 2020

(87) PCT Pub. No.: WO2019/139509
PCT Pub. Date: Jul. 18, 2019

(65) Prior Publication Data
US 2020/0337076 A1    Oct. 22, 2020

(51) Int. Cl.
*H04W 72/12* (2009.01)
*H04W 24/08* (2009.01)
(Continued)

(52) U.S. Cl.
CPC ....... *H04W 72/1273* (2013.01); *H04L 1/0003* (2013.01); *H04L 5/0044* (2013.01);
(Continued)

(58) Field of Classification Search
CPC ............. H04W 72/1273; H04W 24/08; H04W 72/042; H04W 72/0493; H04L 5/0044; H04L 1/0003
See application file for complete search history.

(56) References Cited

U.S. PATENT DOCUMENTS 10,834,599 B2 * 11/2020 Seo .................. H04L 1/0071

FOREIGN PATENT DOCUMENTS

JP    WO 2016121257    * 12/2015 ............... H04B 7/04

OTHER PUBLICATIONS

Huawei, HiSilicon, Dynamic resource multiplexing of downlink control and data; 3GPP TSG RAN WG1 NR Ad Hoc Meeting; R1-1700397; Spokane, USA, Jan. 16-20, 2017.*
(Continued)

*Primary Examiner* — Kevin C. Harper
*Assistant Examiner* — Henry Baron
(74) *Attorney, Agent, or Firm* — Coats & Bennett, PLLC

(57) ABSTRACT

Embodiments herein relate to a method performed by a radio network node (110) in a RAN for scheduling DL data for a UE (120) in a control region subset (140). The UE (120) has one or more control resource sets (CORESETs) (130) configured in a control region (150), in which CORESET (130) the UE (120) should monitor for (PDCCH). The method comprises determining to transmit DL data to the UE (120) in the control region subset, when the amount of DL data for the UE (120) is less or equal to a threshold. Embodiments herein further relate to a radio network node (110) in a RAN, for scheduling DL data for a UE (120) in a control region subset (140). The radio network node (110) is configured to perform the method for scheduling DL data in a control region subset (140).

16 Claims, 11 Drawing Sheets

(51) Int. Cl.
*H04W 72/04* (2009.01)
*H04L 1/00* (2006.01)
*H04L 5/00* (2006.01)

(52) U.S. Cl.
CPC ......... *H04W 24/08* (2013.01); *H04W 72/042* (2013.01); *H04W 72/0493* (2013.01)

(56) References Cited

OTHER PUBLICATIONS

Huawei et al., "Dynamic Resource Multiplexing of Downlink Control and Data", 3GPP TSG RAN WG1 NR Ad Hoc Meeting, Spokane, USA, Jan. 16, 2017, pp. 1-3, R1-1700397, 3GPP.
Ericsson, "On Resource Sharing Between PDCCH and PDSCH", 3GPP TSG-RAN WG1 Meeting #89, Hangzhou, China, May 15, 2017, pp. 1-2, R1-1709072, 3GPP.

* cited by examiner

METHOD AND RADIO NETWORK NODE FOR SCHEDULING DATA IN CONTROL REGION

TECHNICAL FIELD

Embodiments herein relate to a method and a radio network node for scheduling data in a control region of a down link (DL) subframe.

BACKGROUND

Third Generation Partnership Project (3GPP) 5G New Radio (NR) systems use physical downlink control channels (PDCCHs) for Downlink Control Information (DCI), such as e.g. downlink scheduling assignments and uplink scheduling grants. The PDDCCHs may be transmitted by a radio network node, such as a gNB, comprised in the 5G Next Generation Radio Access Network (NG-RAN). The PDCCHs are in general transmitted at the beginning of a slot and relate to data in the same or a later slot. However, for mini-slots PDCCH can also be transmitted within a regular slot. Different formats, which may also be referred to as sizes, of the PDCCHs may handle different DCI payload sizes and different aggregation levels, i.e. different code rate for a given payload size. A User Equipment (UE) is usually configured, implicitly and/or explicitly, to blindly monitor or search for a number of PDCCH candidates of different aggregation levels and DCI payload sizes. Upon detecting a valid DCI message, i.e. when the decoding of a candidate is successful and the DCI contains an identity (ID) the UE is told to monitor, the UE follows the DCI, such as e.g. receives the corresponding downlink data or transmits data in the uplink. The blind decoding process comes at a cost in complexity in the UE but is required in order to provide flexible scheduling and handling of different DCI payload sizes.

In NR, there are currently discussions on how to configure control resource regions where the UE can monitor for PDCCH transmissions and how a UE can be configured with multiple control resource regions. Some of these control regions may be used for sending common control messages that are intended for multiple UEs and some may be intended for UE-specific control messages. A control region could serve both common and UE-specific control messages. One difference in NR from LTE is that carrier bandwidths may be larger and hence there are benefits seen in the control region not spanning the entire bandwidth of the carrier. Thus, it is expected that control regions may be limited in time and in frequency.

Control regions may be dimensioned to ensure that multiple UEs may be signaled within the control region. In order to do this, statistical multiplexing principles are used where the number of UEs that are assigned to a control region to search for control messages is much greater than the resource available in the control region. Therefore, the search spaces for different UEs are randomized so that statistical multiplexing can be used to minimize the blocking probability when any particular UE needs to be scheduled. Therefore, control regions are expected to be dimensioned to be able to signal PDCCHs for multiple UEs simultaneously and the number of UEs that are assigned to monitor the control region is expected to be greater than the number of UEs that can simultaneously be signaled.

In the following, a CORESET is a control resource set that is configured to the UE. The CORESET is a set of Resource Elements (REs) that spans a set of Physical Resource Blocks (PRBs) in frequency and Orthogonal Frequency-Division Multiplexing (OFDM) symbols in time. A UE may be configured with one or more CORESETs which the UE should monitor for a potential reception of one or more PDCCHs. CORESETs for one UE or different UEs may be, at least partly, overlapping. Data transmissions are transmitted in a Physical Downlink Shared Channel (PDSCH) and a Physical Uplink Shared Channel (PUSCH).

Existing solutions do not adequately deal with situations where a UE is configured with multiple control regions. They also do not optimize signaling complexity for transferring of small data packets.

SUMMARY

It is thus an object of the embodiments herein to provide a method for improving the efficiency of transmission of small data packets from a radio network node to a UE.

According to a first aspect of embodiments herein, the object is achieved by a method performed by a radio network node in a Radio Access Network (RAN), for scheduling DL data for a User Equipment (UE) in a control region. The UE has one or more control resource sets (CORESETs) configured in the control region, in which one or more CORESETs the UE monitors for PDCCH. The radio network node determines to transmit DL data to the UE in one or more control region subsets, when an amount of the DL data for the UE is less or equal to a threshold.

According to a second aspect of embodiments herein, the object is achieved by a radio network node in a RAN, for scheduling DL data for a UE in a control region. The UE has one or more control resource sets (CORESETs) configured in the control region, in which one or more CORESETs the UE monitors for PDCCH. The radio network node determines to transmit DL data to the UE in one or more control region subsets, when an amount of the DL data for the UE is less or equal to a threshold.

It is furthermore provided herein a computer program comprising instructions, which, when executed on at least one processor, cause the at least one processor to carry out any of the methods above, as performed by the radio network node. It is additionally provided herein a computer-readable storage medium, having stored thereon a computer program comprising instructions which, when executed on at least one processor, cause the at least one processor to carry out the method according to any of the methods above, as performed by the radio network node.

By scheduling DL data for the UE in the control region subset when the amount of DL data is less or equal to the threshold a better utilization of available resources can be provided, since a small packet would consume the whole resource in the case of analogue beamforming when only time multiplexing is practically possible.

It also allows for parallelism as the resources in the control region are orthogonal to the resources outside of it and thus allocation can be performed independently from each other, which given the short subframe durations in NR is a large advantage.

Furthermore, DL data sent in the control region will reach the UE faster than DL data sent outside since the last symbol in time is earlier, resulting in lower latency.

BRIEF DESCRIPTION OF THE DRAWINGS

Embodiments will now be described in more detail in relation to the enclosed drawings, in which.

DETAILED DESCRIPTION

In the following, various embodiments of the solution are described. The order of the embodiments is chosen to express the idea as fluently as possible and thus does not indicate their significance. The embodiments may be performed in any suitable order.

Figure 1:
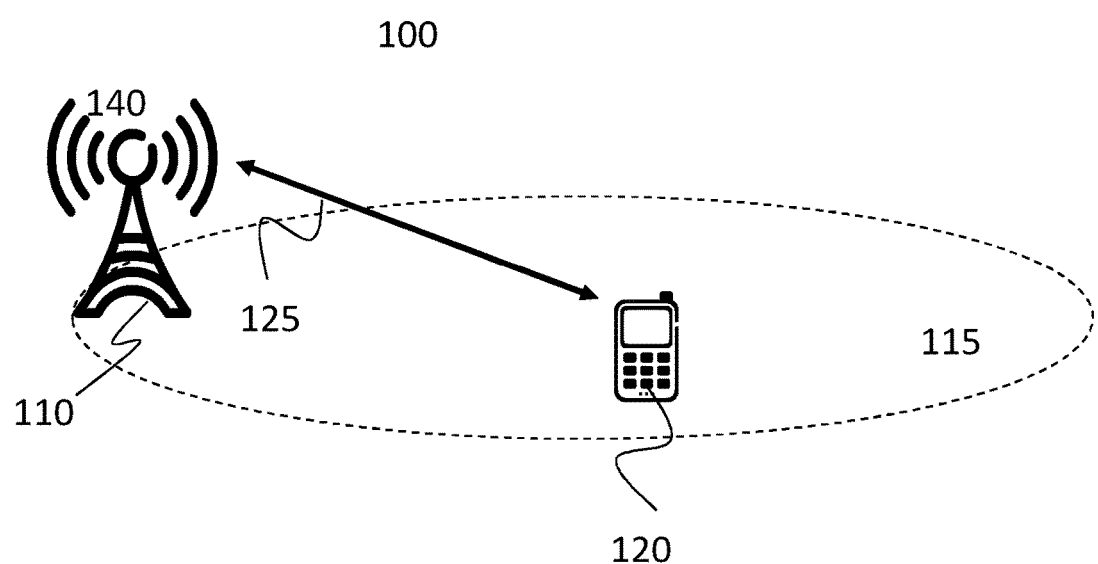
FIG. 1 is a schematic overview depicting an exemplary communication network.

FIG. 1 is a block diagram illustrating an example wireless communication network, according to a particular embodiment. The wireless communication network 100 comprises one or more User Equipment (UE) 120, such as e.g. mobile phones, smart phones, laptop computers, tablet computers, MTC devices, or any other devices that can provide wireless communication and a plurality of radio network nodes 110, such as e.g. base stations, eNBs or gNBs. The UE 120 may also be referred to as a wireless device. The radio network node 110 serves a coverage area 115, which may also be referred to as e.g. a cell or a beam. In general, UEs 120 that are within coverage of the radio network node 110, such as e.g., within the cell 115 served by network node 110, communicate with the network node 110 by transmitting and receiving wireless signals 125. For example, UEs 120 and radio network nodes 110 may communicate wireless signals 125 containing voice traffic, data traffic, and/or control signals. When the radio network node 110 is communicating voice traffic, data traffic, and/or control signals to the UE 120 it may be referred to as a serving network node for the UE 120. The wireless signals 125 may include both downlink transmissions, i.e. from the radio network node 110 to the UE 120, and uplink transmissions, i.e. from the UE 120 to the radio network node 110. Each radio network node 110 may have a single transmitter or multiple transmitters for transmitting signals 125 to UEs 120. In some embodiments, the radio network node 110 may comprise a multi-input multi-output (MIMO) system. Similarly, each UE 120 may have a single receiver or multiple receivers for receiving signals 125 from radio network nodes 110 or other UEs 120.

Resource Allocation

Allocation of resources in both control and data region is performed dynamically for each timeslot by the radio network node 110, such as e.g. the gNB. This may typically be split up over several functional blocks where each block handles some aspects of the resource allocation, such as e.g. control channel allocation. The reason for having several functional blocks is that even though the same basic OFDM framework is used for all channels, the rules and properties for how to do allocations differ vastly between the blocks. A simple example of this is given in FIG. 2, which shows a simplified example of functional blocks used by known radio network nodes, such as e.g. an LTE eNB. The input to the chain of blocks is typically a UE 120 which has a need for resources, such as e.g. having data, and the output can be seen as instructions to be executed by the user plane parts of the radio protocol stack, such as e.g. Radio Link Control (RLC), Medium Access Control (MAC) and/or Physical layer (PHY).

The cardinality for all blocks does not have to be the same. It may be perfectly possible for example to have several PDCCH instances representing different CORESETs which all allocate PDCCH pointing to the same Physical Downlink Shared Channel (PDSCH) and/or Physical Uplink Shared Channel (PUSCH) instance. PDCCH in one CORESET may also point to PDSCH/PUSCH in different timeslots or part of the band in such a way that it is practical to have different instances doing the allocation.

Considering the above, it is expected that in low load conditions, there may often be only one or two UEs 120 that are sent PDCCHs in a control region. These UEs 120 may have data transmitted in the remaining parts of a slot outside of the control region. In this situation it is expected that there may be unused resources within the control region that are wasted. Therefore, it would be beneficial to reuse these unused resources in the control region for data transmission to the scheduled UEs 120.

Apart from dynamically determining which of the first OFDM-symbols are part of the control region as done in LTE, a set of new ways are proposed in e.g. NR.

Figure 2:
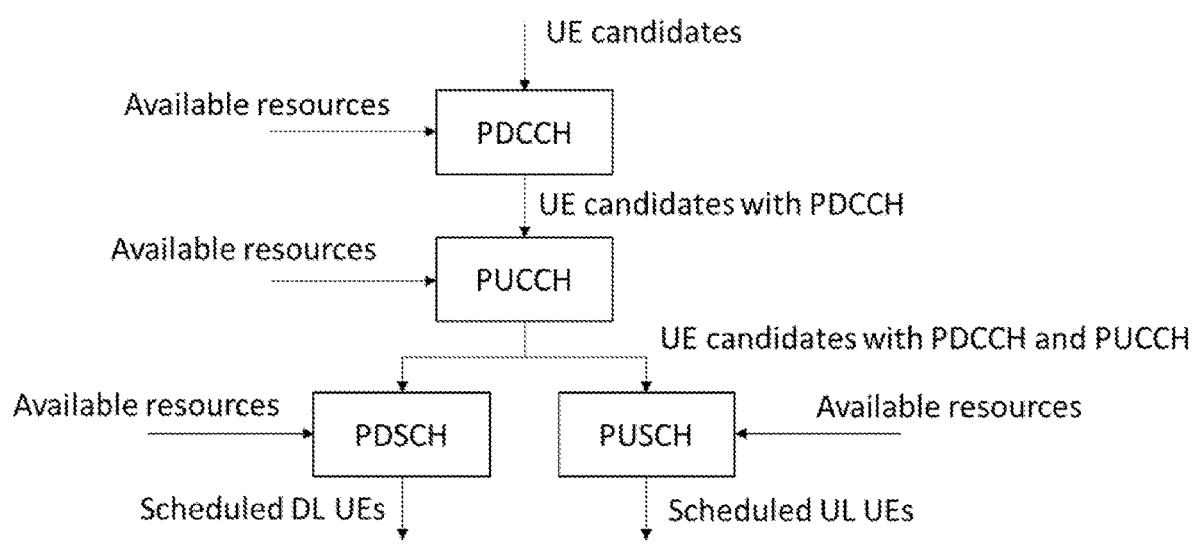
FIG. 2 is a block diagram depicting a functional block structure for resource allocation according to known technologies.
Figure 3:
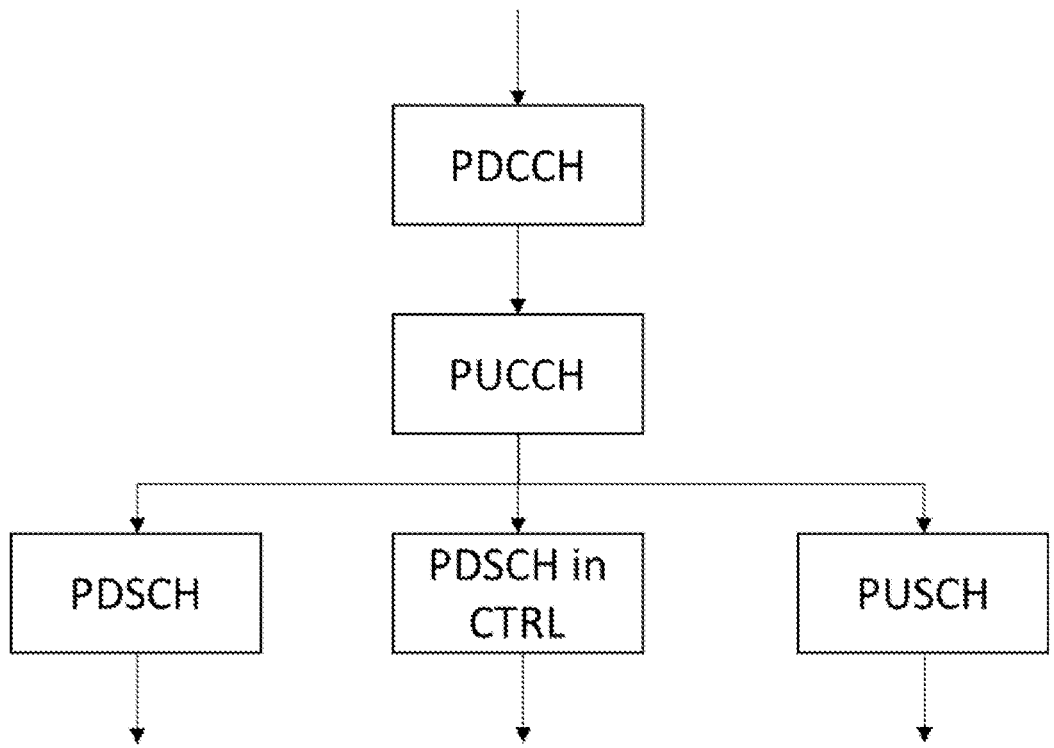
FIG. 3 is a block diagram depicting a functional block structure for resource allocation according to embodiments herein.

According to one embodiment herein one more functional block may be added to the example structure in FIG. 2 for allocating data in the control region only. A simple example of this embodiment is shown in FIG. 3, which shows the added functional block for PDSCH in Control (CTRL) region, which in FIG. 3 is referred to as "PDSCH in CTRL", used by the radio network node 110, such as e.g. the gNB, to schedule the PDSCH in the control region.

The new block called "PDSCH in CTRL" may handle everything needed to instruct user plane in the radio network node 110, such as the gNB, to perform a data transmission in the control region according. This may comprise TBS and MCS selection as well as determining exactly which resource elements data shall be mapped to.

In one embodiment herein, the radio network node 110 may decide, for at least one UE 120, whether to map data in the downlink direction to the "normal" data region PDSCH or to the control region. The decision to map DL data to the data region may be performed by the PDSCH block shown in FIGS. 2 and 3 and the decision to map DL data to the control region 150 may be performed by PDSCH in CTRL block shown in FIG. 3.

The decision to map the DL data to the control region 150 may be made based on the amount of DL data available for downlink transmissions for said UE 120. When the amount of DL data available for downlink transmission is significantly less than the available bits in the OFDM symbols dedicated for the PDSCH, it may be beneficial to transmit said DL data in a control region subset 140 and thereby increasing the number of bits available in the PDSCH region for another UE having a larger amount of data available for downlink transmission. Thereby, the utilization of resources may be improved. The term control region subset 140 shall herein be interpreted as a subset of the physical resources that are mapped to the control region, which subset of physical resources may or may not be related to a CORESET.

The decision to map the DL data to the control region subset may further be made based on the type of data for said UE or a significance of said data, such as e.g. radio protocol information vs higher level payload. Radio protocol information may typically be of small size and is therefore suitable for being transmitted in the control region, while this may not be equally suitable for higher layer payloads.

In one embodiment herein, the decision to map the DL data to the control region may further be made based on an estimated channel quality of said UE 120.

In some embodiments herein, the radio network node 110, such as e.g. the gNB may dedicate at least one control region subset, and or a CORESET out of the one or more CORESETs configured for the UE 120, as being dedicated for sending DL data in the control region. In said control region subset and/or CORESET, only one PDCCH may be allocated and that PDCCH must belong to the UE 120 for which DL data shall be mapped to the control region. The radio network node 110 may dedicate said at least one control region subset in a static and/or semi-static manner. Hence, the radio network node 110 may dedicate said control region subset once or may perform a continuous dedicating of the control region being dedicated for sending DL data in the control region.

In one embodiment herein, the radio network node 110 may dedicate a second OFDM symbol out of a first and the second OFDM symbol in a timeslot to use as a dedicated control region subset and/or CORESET. In a further embodiment herein, the radio network node 110 may place the second OFDM symbol outside of the control region, which may also be referred to limiting the control region to the first OFDM symbol, if there is no UE 120 satisfying the above mentioned requirements for mapping DL data to the control region. Thus, the second OFDM symbol becomes available for "normal" PDSCH allocation.

Figure 4A:
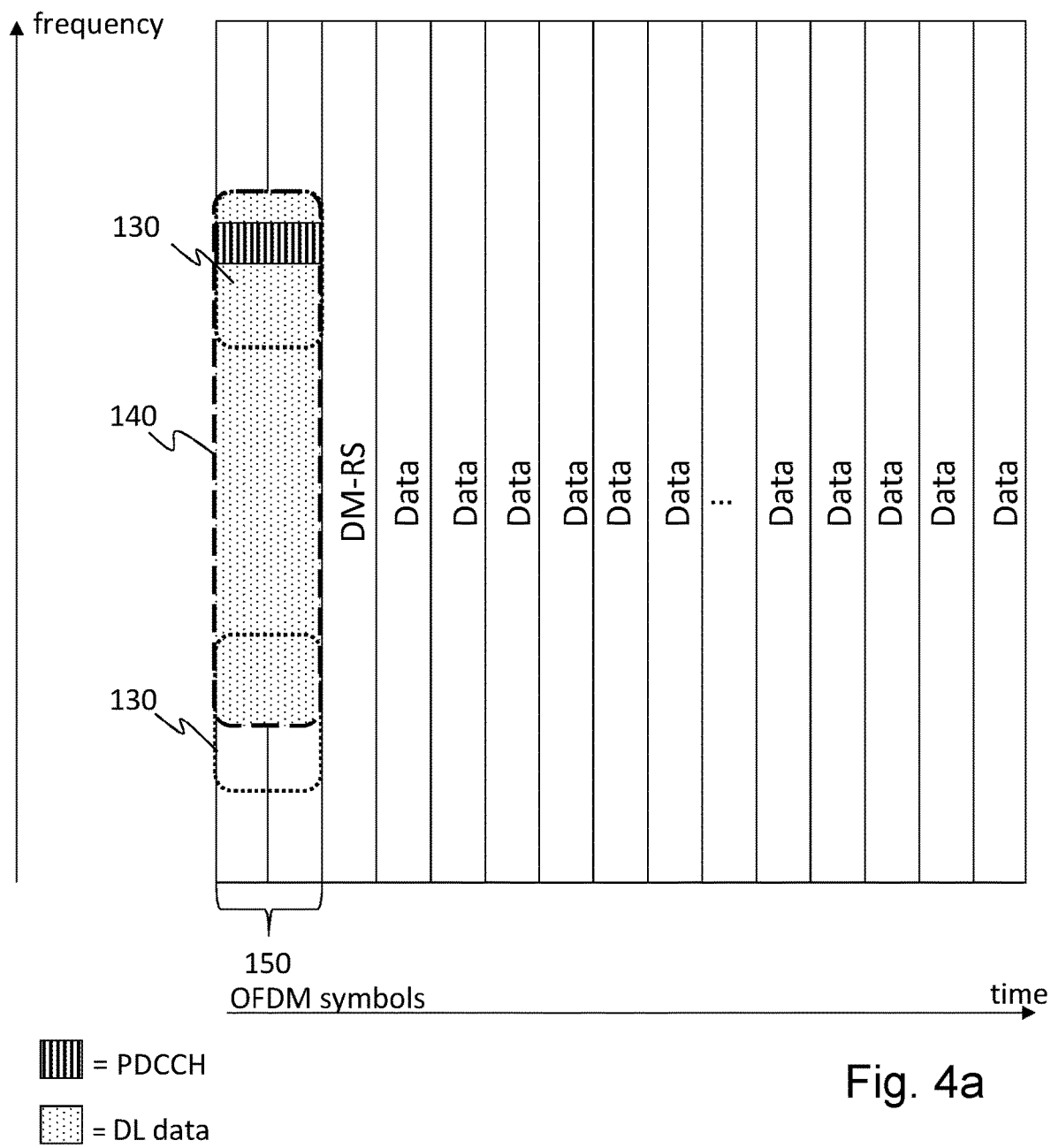
FIG. 4*a* is a schematic overview of DL data allocation in the control region according to one embodiment herein.
Figure 4B:
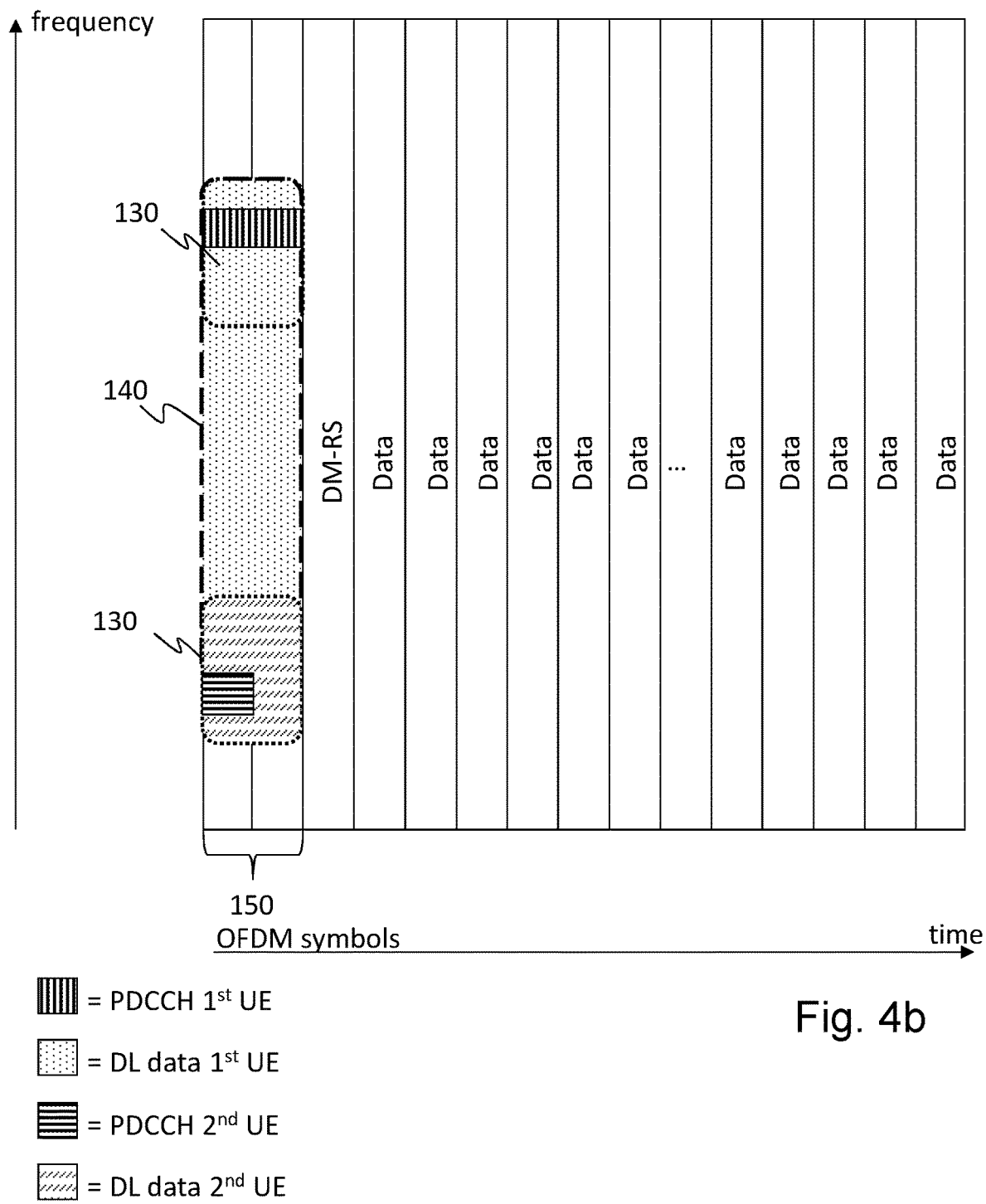
FIG. 4*b* is a schematic overview of DL data allocation in the control region according to a second embodiment herein.
Figure 4C:
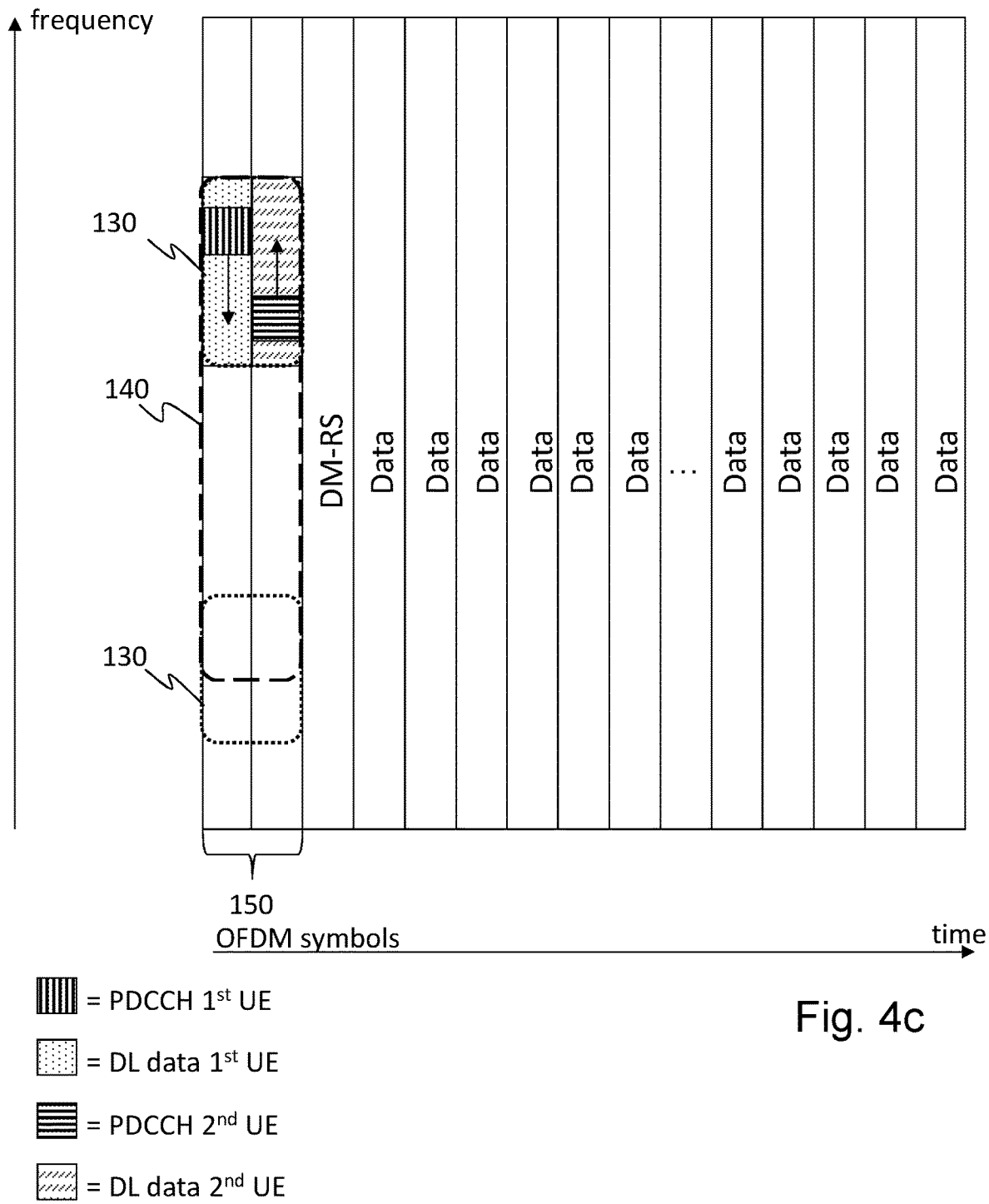
FIG. 4*c* is a schematic overview of DL data allocation in the control region according to a third embodiment herein.

FIG. 4*a-c* disclose the control region for a subframe in 5G NR according to embodiments herein. The subframe comprises a set of generic spectrum resources, wherein the generic spectrum resources are time/frequency/code/spatial layer etc. The extension of the sub frame in the time domain is divided into OFDM symbols. The PDCCH carries UE-specific scheduling assignments for Downlink (DL) resource allocation, Uplink (UL) grants, Physical Random Access Channel (PRACH) responses, UL power control commands, and common scheduling assignments for signaling messages, such as e.g. system information, paging, etc. The PDCCH is transmitted in a control region 150 of the sub frame, which occupies the first 1 or 2 or 3 OFDM symbols at the beginning of each sub frame. The sub frame further comprises a data region dedicated for transmitting DL data. In 5G NR the PDCCH for a UE 120 may be sent in one or more specific CORESETs 130 configured for the UE 120. The one or more CORESETs may be mapped to a part of the frequency spectrum of the control region. The control region may further comprise one or more control region subsets 140 which is a subset of the set of generic spectrum resources for which it is possible to map a PDCCH for the UE 120. Mapping shall herein be interpreted as both configuring a CORESET 130 and actually transmitting PDCCH. PDCCHs are only mapped to a CORESET 130, hence it is ensured that no PDCCHs are sent in the rest of the control region subset 140. The one or more CORESETs 130 may be UE 120 specific and are relevant only for transmitting PDCCH, one or more UEs 120 may however share the same CORESETs 130. The CORESETs 130 may be fully or partly contained within one or more control region subsets 140. The control region 150 may e.g. be divided into a number of Control Channel Elements (CCE:s), wherein one CCE defines the smallest resource that may be mapped to a UE. I the control region 150 is divided into CCEs 0, 1, . . . , 99 a CORESET may e.g. span the CCEs 0, 1, . . . , 19 which may be configured for all UEs 120, the rest of the CCEs 20, . . . , 99 may be an "unmapped" (for PDCCH) control region subset 140 on which DL data may be mapped according to the embodiments herein.

According to one embodiment shown in FIG. 4*a*, the UE 120 may receive PDCCH (marked with vertical stripes) in a first of the one or more CORESETs 130. The radio network node 110 may, based on the requirements mentioned above, decide to map DL data (marked with dots) for the UE 120 in the control region subset 140. In this case the DL data will be mapped to the control region subset 140 and the parts of the one or more CORESETs 130 configured for the UE 120 which are comprised within the control region subset 140. In this embodiment no DL data for the UE 120 is transmitted in the dedicated data region, thereby allowing other UEs 120 having a higher amount of DL data scheduled to utilize the complete dedicated data region.

According to a further embodiment herein shown in FIG. 4*b*, a first and a second UE 120 receiving PDCCHs may be configured with one or more control region subsets and/or CORESETs 130 for scheduled DL data, wherein each of the CORESETs 130 are fully overlapping with the one or more CORESETs 130 of the other UE 120. The first UE may have DL data (marked with dots) scheduled in the control region subset 140 and in the CORESET 130 out of the one or more CORESETs 130 in which the PDCCH for the first UE (marked with vertical stripes) was received. The second UE may have DL data (marked with diagonal short stripes) scheduled only in the CORESET 130 out of the one or more CORESETs 130 in which the second UE has received the PDCCH (marked with horizontal stripes).

According to a further embodiment herein shown in FIG. 4*c*, the two UEs receiving PDCCHs for scheduled DL data may each be configured with one or more CORESETs 130 each being fully overlapping with the CORESETs 130 of the other UE 120. The first and the second UEs 120 may both receive PDCCH and DL data in the same CORESET 130 out of the one or more CORESETs 130, but in different OFDM symbols. The first UE may have DL data (marked with dots) scheduled only in the OFDM symbol(s) of the one or more CORESETs 130 in which the PDCCH for the first UE (marked with vertical stripes) was received, such as in the first OFDM symbol according to the embodiment shown in FIG. 4*c*. The second UE may have DL data (marked with diagonal short stripes) scheduled only in the OFDM symbol(s) of the one or more CORESETs 130 in which the second UE has received the PDCCH (marked with horizontal stripes), such as in the second OFDM symbol according to the embodiment shown in FIG. 4c. This has the benefit that two UEs 120 may share the resources of the control region subset 140 and/or the CORESET 130. This is beneficial especially at high frequencies where all the energy of the transmission may be required for sending a small beam directed towards a single UE 120 at high frequencies. By transmitting DL data for the two UEs in separate OFDM symbols, the beam may be directed towards the single UE 120 scheduled for data transmission in the specific OFDM symbol.

Figure 5:
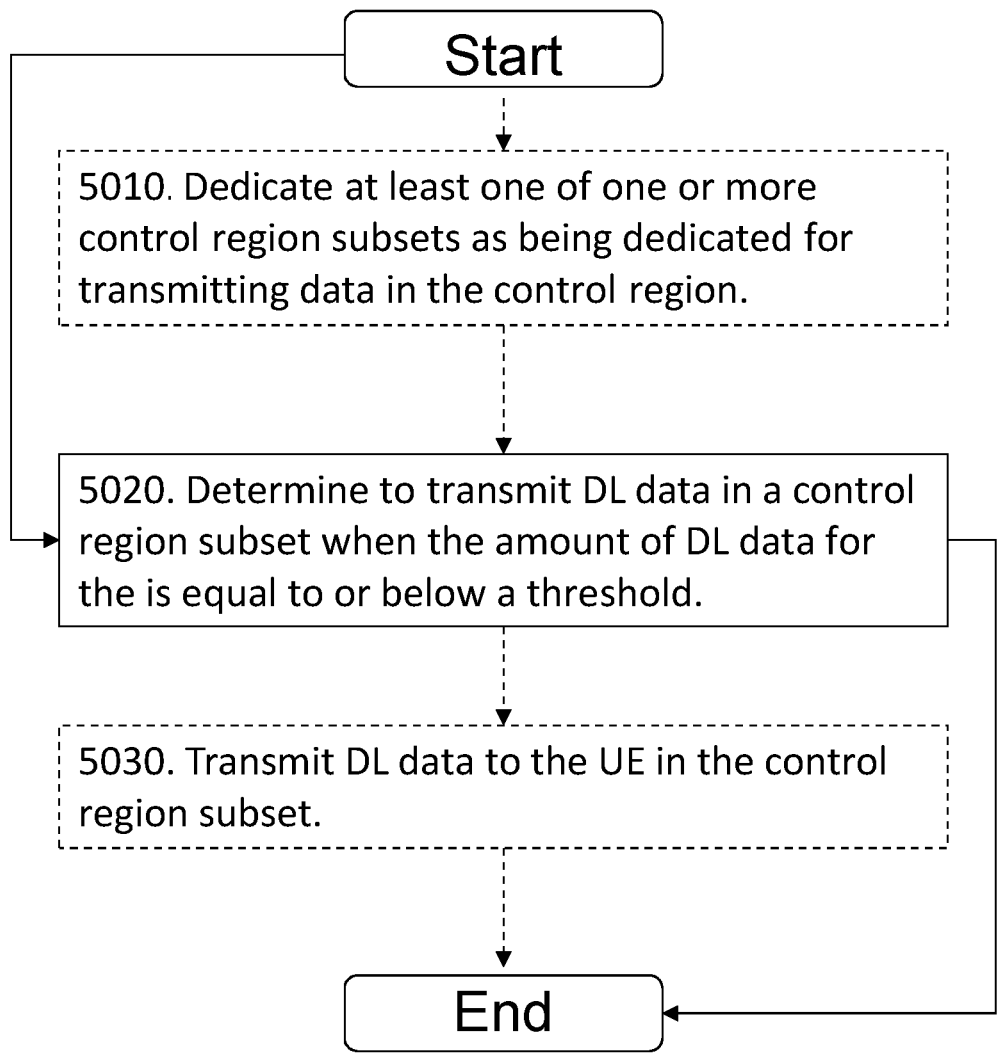
FIG. 5 is a flowchart depicting a method performed by a radio network node according to embodiments herein.

The method actions performed by the radio network node 110 in the RAN, such as e.g. in an NG-RAN, for scheduling DL data for the UE 120 in the control region subset 140 according to embodiments herein, will now be described with reference to a flowchart depicted in FIG. 5. The UE 120 has one or more control resource sets (CORESETs) 130 configured in the control region 150. The one or more CORESETs 130 are monitored by the UE 120 for the PDCCH.

The actions do not have to be taken in the order stated below, but may be taken in any suitable order. Actions performed in some embodiments only are marked with dashed boxes.

Action 5010: The radio network node 110 may dedicate at least one control region subset 140 out of the one or more control region subsets 140 and/or the one or more CORESETs as being dedicated for transmitting DL data in the control region. At least one of the one or more CORESETs 130 of the UE 120 may be fully contained within said at least one dedicated control region subset 140. The only PDCCH which may be allocated in this at least one dedicated control region subset 140, across any overlapping one or more CORESETs 130, is for the UE 120 having scheduled DL data, i.e. for which UE 120 DL data shall be transmitted in the at least one dedicated control region subset 140.

The radio network node 110 may dedicate the at least one dedicated control region subset 140 in a static or semi-static manner. Hence, the radio network node 110 may dedicate said one or more control region subsets 140 once, e.g. during initial configuration, or may perform a continuous dedicating of the one or more control region subsets 140 being dedicated for sending DL data in the control region. The radio network node 110 may in some embodiments dedicate the second OFDM symbol out of the first and the second OFDM symbol in a timeslot as being dedicated for transmitting DL data in the one or more control region subsets 140.

When there is no UE 110 meeting the criteria for transmitting DL data in the one or more control region subsets 140 in accordance with action 5020, the radio network node 110 may reduce the one or more control region subset 140 to the first OFDM symbol. This has the benefit that the control region is reduced and the second OFDM symbol may thus be used as a normal PDSCH region and becomes available for "normal" PDSCH allocation.

Action 5020: The radio network node 110 determines to transmit DL data to the UE 120 in the one or more control region subsets 140, when the amount of DL data scheduled for the UE 120 is less or equal to a threshold. The threshold may be a parameterized threshold of a number of bits. The parameterized threshold may depend on the size of the carrier and may be a percentage of the total amount of bits available in the control region of the carrier. The threshold may e.g. be in the range of 100 to 10000 bits, such as e.g. 500 bits.

The threshold may be based on the available resources of the one or more control region subsets 140. When a large number of bits of the control region is used for control channel signaling the threshold may be reduced. Vice versa, when the number of bits used for control channel signaling is reduced, the threshold for data signaling may be increased.

The threshold may further be based on an estimated channel quality of the UE 120. When the channel quality is low the redundancy of the transmission is increased, hence the resources required for transmitting the DL data with the higher redundancy is also increased. The radio network node 110 may e.g. determine to transmit DL data in the control region subset 140 when the estimated channel quality is above a level which allows a complete data package to be transmitted in the control region subset (140).

The radio network node 110 may further determine to transmit DL data to the UE 120 in the control region subset, based on the significance of the DL data to be sent to the UE 120. The significance of the data may e.g. be a derived from a Quality of Service class, a UE capability, a derived knowledge about traffic type and/or a remaining packet delay budget. High priority data may e.g. be sent in the control region directly, while transmission of lower priority DL data may be delayed in order to bundle up DL data so that it may be transmitted to the UE 120 in a more spectrally efficient manner.

The radio network node 110 determines to transmit DL data for the UE 120 in the control region 150 only. Transmitting DL data in the control region only, shall herein be understood as the UE 120 not having any DL data transmission scheduled outside of the control region 150, such as e.g. in the normal PDSCH region.

In a further embodiment herein, the radio network node 110 may determine to transmit the DL data to the UE 120 in the one or more CORESETs 130 for the UE 120 only. In some embodiments, the radio network node 110 may determine to schedule DL data for one single UE 120 in all OFDM symbols of the one or more control region subsets 140 or CORESETs 130 only. In a further embodiment however, the radio network node 110 may schedule DL data for a first UE 120 in the first OFDM symbol of the one or more control region subsets 140 or CORESETs 130 and DL data for a second UE 120 in the second and/or subsequent OFDM symbol of the one or more control region subsets 140 or CORESETs 130. This has the benefit that two UEs 120 may share the resources of the one or more control region subsets 140 and/or CORESETs 130 even at high frequencies since all the energy may be required for sending a small beam directed towards a single UE 120 at high frequencies. By transmitting DL data for the two UEs in separate OFDM symbols, the beam may be directed towards the single UE 120 scheduled for DL data transmission in the specific OFDM symbol. This embodiment is similar to the embodiment shown in FIG. 4c.

Action 5030: The radio network node 110 may further transmit the DL data to the UE 120 in the one or more control region subsets 140. This may e.g. be performed by the radio network node 110, and/or the PDSCH in CTRL block, instructing the user plane in the radio network node 110 to perform DL data transmission to the UE 120 in the one or more control region subsets 140. The radio network node 110 may transmit the DL data for the UE 120 in the control region 150 only.

The radio network node 110, and/or the PDSCH in CTRL block, may further, in preparation for the transmission determine a Transport Block Size (TBS), a Modulation and Coding Scheme (MCS) and/or resource elements (REs) which the DL data shall be mapped on.

Figure 6:
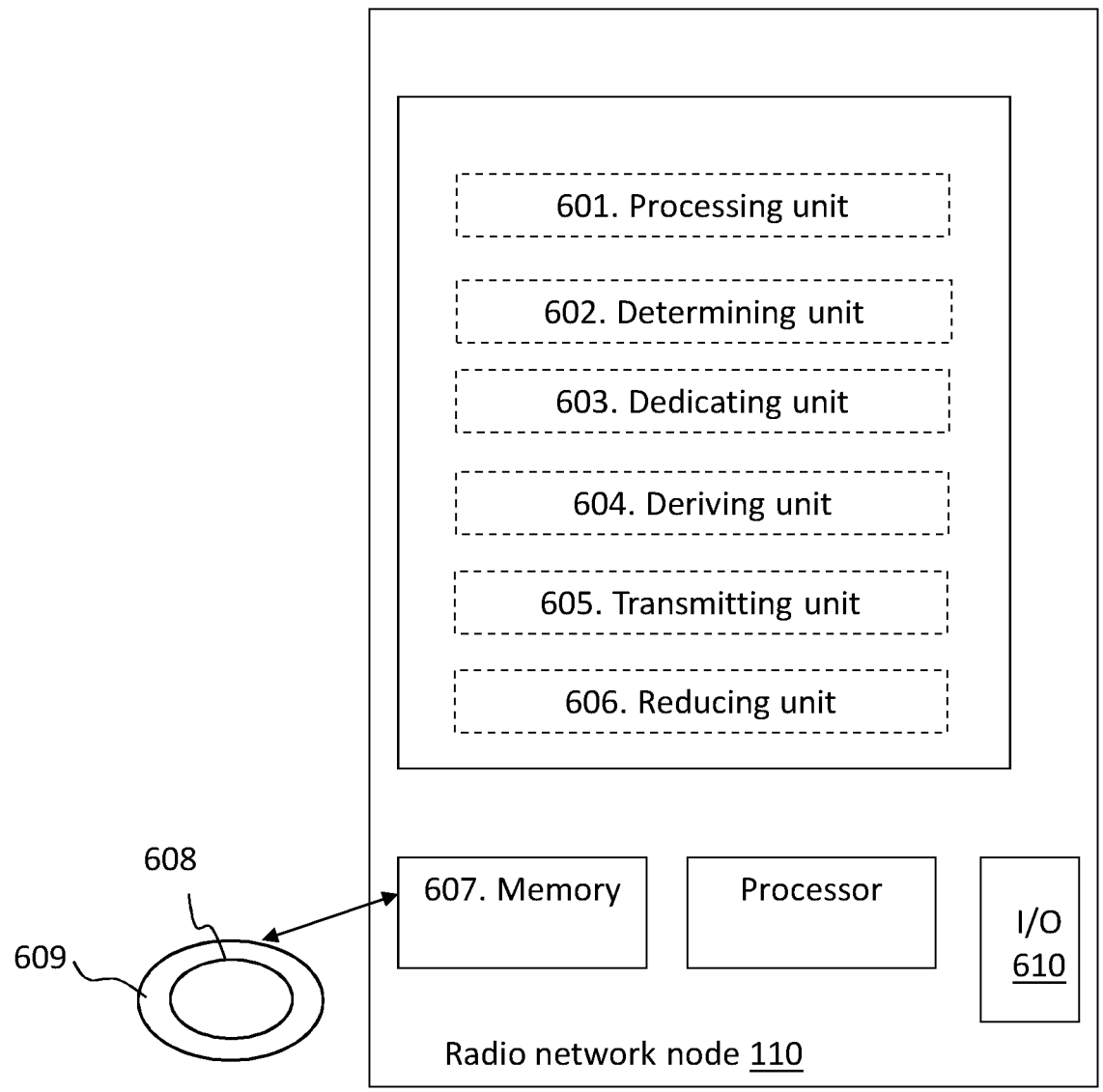
FIG. 6 is a block diagram depicting a radio network node according to embodiments herein.

FIG. 6 is a block diagram depicting the radio network node 110 in the RAN, such as e.g. in an NG-RAN, for scheduling DL data for the UE 120 in a control region subset 140 according to embodiments herein. The UE 120 has one or more CORESETs 130 and/or one or more control region subsets 140 configured in a control region 150. The one or more CORESETs 130 are monitored by the UE 120 for the PDCCH.

The radio network node 110 may comprise a processing unit 601, such as e.g. one or more processors, a determining unit 602, a dedicating unit 603, a deriving unit 604, a transmitting unit 605 and a reducing unit 606 as exemplifying hardware units configured to perform the methods described herein. The radio network node 110 further comprises an input/output circuit 610 for communicating with one or more second radio devices, such as radio network nodes or UEs. The input/output device 610 may comprise a transmitter, a receiver and/or a plurality of antennas.

The radio network node 110, the determining unit 602 and/or the processing unit 601 is configured to determine to transmit DL data to the UE 120 in the one or more control region subsets 140, when the amount of DL data that is to be transmitted to the UE 120 is less or equal to a threshold. The threshold may e.g. be a parameterized threshold of a number of bits.

The radio network node 110, the determining unit 602 and/or the processing unit 601 may further be configured to determine the threshold based on the available resources of the one or more control region subsets 140.

The radio network node 110, the determining unit 602 and/or the processing unit 601 may further be configured to determine the threshold based on an estimated channel quality of the UE 120.

The radio network node 110, the determining unit 602 and/or the processing unit 601 may further be configured to determine to transmit DL data in the one or more control region subsets 140 when the estimated channel quality is above a level which allows a complete data package to be transmitted in the one or more control region subsets 140.

The radio network node 110, the determining unit 602 and/or the processing unit 601 may further be configured to determine to transmit DL data to the UE 120 in the one or more control region subsets 140 based on the significance of the data to be sent to the UE 120.

The radio network node 110, the determining unit 602, the deriving unit 604 and/or the processing unit 601 may further be configured to derive the significance of the data from a Quality of Service class, a UE capability, a derived knowledge about traffic type and/or a remaining packet delay budget.

The radio network node 110, the transmitting unit 605 and/or the processing unit 605 may further be configured to transmit DL data to the UE 120 in the one or more control region subsets 140.

The radio network node 110, the dedicating unit 603 and/or the processing unit 601 may further be configured to dedicate at least one of the one or more control region subsets 140 as being dedicated for transmitting DL data in the control region, wherein at least one of the one or more CORESETs 130 of the UE 120 is fully contained within said dedicated one or more control region subsets 140 and wherein the only PDCCH allocated in this dedicated one or more subsets 140, across any overlapping CORESETs 130, is for the UE 120 having scheduled DL data in the dedicated one or more control region subsets 150, i.e. the UE 120 for which DL data shall be transmitted in the dedicated one or more control region subsets 150.

The radio network node 110, the dedicating unit 603 and/or the processing unit 601 may further be configured to dedicate the at least one dedicated control region subset 140 out of the one or more control region subsets 140 in a static or semi-static manner.

The radio network node 110, the dedicating unit 603 and/or the processing unit 601 may further be configured to dedicate the second OFDM symbol out of a first and the second OFDM symbol in a timeslot as being dedicated for transmitting DL data in the control region subset 140.

The radio network node 110, the reducing unit 606 and/or the processing unit 601 may further be configured to reduce the control region subset 140 to the first OFDM symbol, when there is no UE 120 meeting the criteria for transmitting DL data in the control region subset 140 according to the embodiments herein.

The radio network node 110, the determining unit 602, the deriving unit 604 and/or the processing unit 601 may further be configured to determine a Transport Block Size (TBS), a Modulation and Coding Scheme (MCS) and/or resource elements (REs) which the DL data shall be mapped on.

The radio network node 110, the transmitting unit 605 and/or the processing unit 601 may further be configured to transmit DL data for the UE 120 in the one or more control region subsets 140 only.

The embodiments herein may be implemented through a respective processor or one or more processors, such as the processing unit 601 of a processing circuitry in the radio network node depicted in FIG. 6, together with respective computer program code for performing the functions and actions of the embodiments herein. The program code mentioned above may also be provided as a computer program product, for instance in the form of a data carrier carrying computer program code for performing the embodiments herein when being loaded into the radio network node 110. One such carrier may be in the form of a CD ROM disc. It is however feasible with other data carriers such as a memory stick. The computer program code may furthermore be provided as pure program code on a server and downloaded to the radio network node 110.

The radio network node 110 may further comprise a memory 607. The memory 706 comprises one or more memory units to be used to store data on, such as software, patches, system information, configurations, diagnostic data, performance data and/or applications to perform the methods disclosed herein when being executed, and similar.

The methods according to the embodiments described herein for the radio network node 110 are respectively implemented by means of e.g. a computer program 608 or a computer program product, comprising instructions, i.e., software code portions, which, when executed on at least one processor, cause the at least one processor to carry out the actions described herein, as performed by the radio network node 110. The computer program 608 may be stored on a computer-readable storage medium 609, e.g. a disc or similar. The computer-readable storage medium 609, having stored thereon the computer program, may comprise instructions which, when executed on at least one processor, cause the at least one processor to carry out the actions described herein, as performed by the radio network node 110. In some embodiments, the computer-readable storage medium may be a non-transitory computer-readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

Further Extensions and Variations

Figure 7:
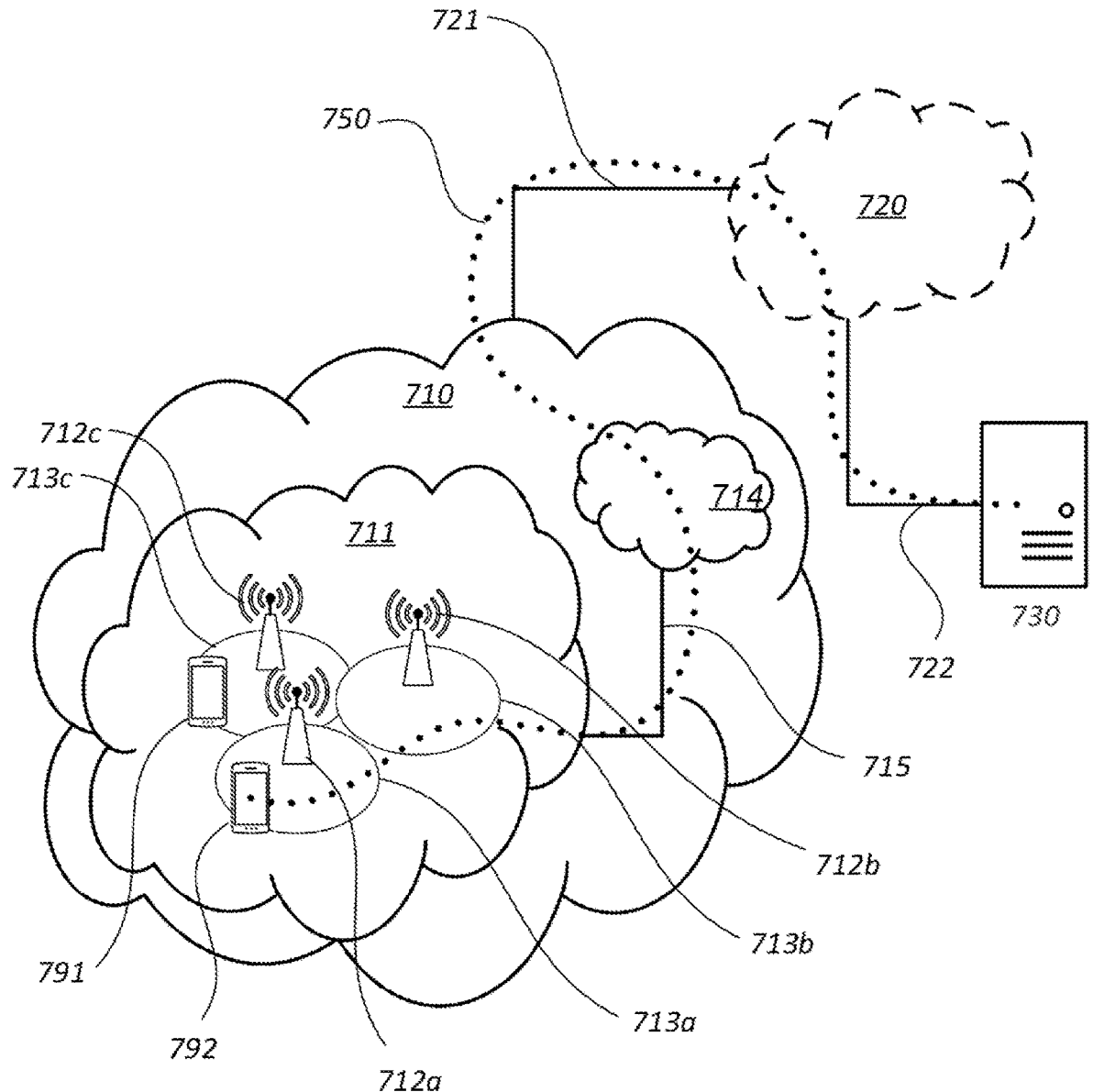
FIG. 7 is a schematic overview of a telecommunication network connected via an intermediate network to a host computer in accordance with some embodiments.

With reference to FIG. 7, in accordance with an embodiment, a communication system includes a telecommunication network 710 such as the wireless communications network 100, e.g. a WLAN, such as a 3GPP-type cellular network, which comprises an access network 711, such as a radio access network, and a core network 714. The access network 711 comprises a plurality of base stations 712a, 712b, 712c, such as the radio network node 110, access nodes, AP STAs NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) e.g. the UE 120 such as a Non-AP STA 791 located in coverage area 713c is configured to wirelessly connect to, or be paged by, the corresponding base station 712c. A second UE 792 e.g. the wireless device 122 such as a Non-AP STA in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
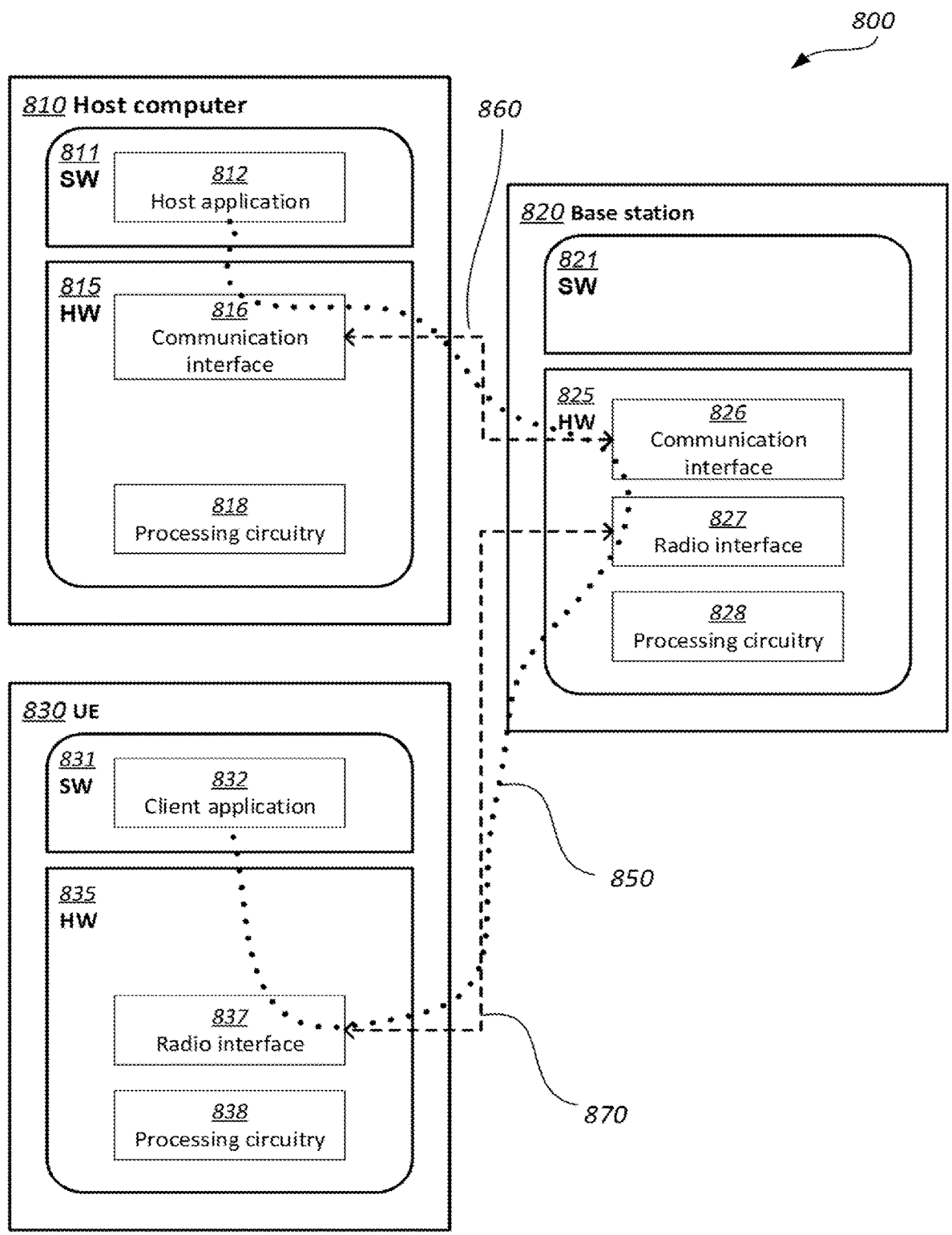
FIG. 8 is a schematic overview of a host computer communicating via a base station with a user equipment over a partially wireless connection in accordance with some embodiments.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the data rate and latency, since embodiments herein allocate small amounts of DL data to the control region thereby increasing the resources available in the data region for larger amount of DL data, and thereby provide benefits such as reduced user waiting time, relaxed restriction on file size and better responsiveness.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
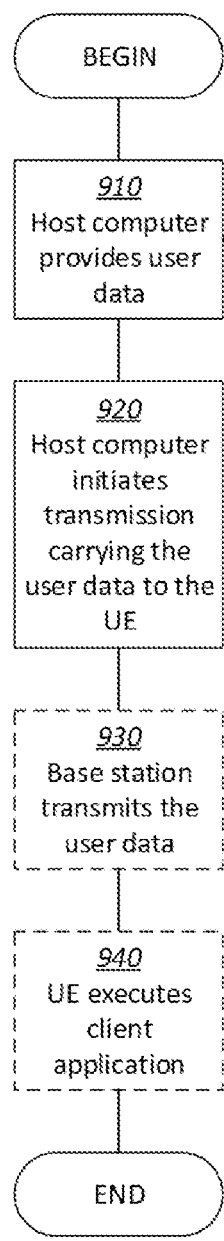
FIG. 9 is a flowchart depicting methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 9 will be included in this section. In a first action 910 of the method, the host computer provides user data. In an optional subaction 911 of the first action 910, the host computer provides the user data by executing a host application. In a second action 920, the host computer initiates a transmission carrying the user data to the UE. In an optional third action 930, the base station transmits to the UE the user data which was carried in the transmission that the host computer initiated, in accordance with the teachings of the embodiments described throughout this disclosure. In an optional fourth action 940, the UE executes a client application associated with the host application executed by the host computer.

Figure 10:
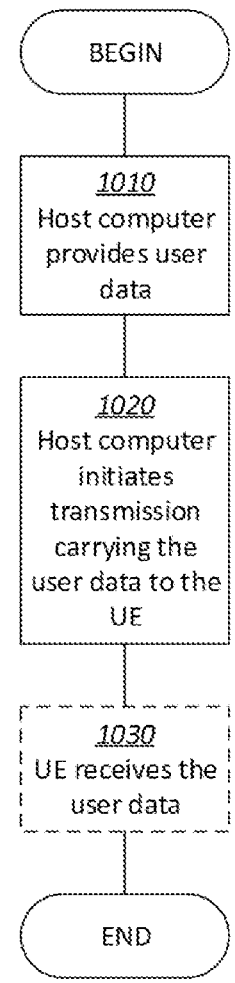
FIG. 10 is a flowchart depicting methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 10 will be included in this section. In a first action 1010 of the method, the host computer provides user data. In an optional subaction (not shown) the host computer provides the user data by executing a host application. In a second action 1020, the host computer initiates a transmission carrying the user data to the UE. The transmission may pass via the base station, in accordance with the teachings of the embodiments described throughout this disclosure. In an optional third action 1030, the UE receives the user data carried in the transmission.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a radio network node in a Radio Access Network (RAN), for scheduling downlink (DL) data for a User Equipment (UE) in a control region; wherein the UE has one or more control resource sets (CORESETs) configured in the control region in which the UE monitors for Physical Downlink Control Channel (PDCCH); the method comprising the radio network node:
- determining to transmit DL data to the UE in one or more control region subsets when an amount of the DL data for the UE is less or equal to a threshold, wherein:
  - the threshold is a parameterized threshold of a number of bits;
  - defines a percentage of the total amount of bits available in the control region of a carrier; and
  - is based on available resources of the control region subset and on an estimated channel quality of the UE; and
- transmitting DL data to the UE in the control regions subset.

2. The method of claim 1, wherein the threshold is based on an estimated channel quality of the UE.

3. The method of claim 2, wherein the radio network node determines to transmit DL data in the control region subset when the estimated channel quality is above a level which allows a complete data package to be transmitted in the control region subset.

4. The method of claim 1, wherein the determining to transmit DL data to the UE in the control region subset is based on a significance of the DL data for the UE.

5. The method of claim 4, wherein the significance of the DL data is derived from a Quality of Service class, a UE capability, a derived knowledge about traffic type, and/or a remaining packet delay budget.

6. The method of claim 1, further comprising transmitting DL data to the UE in the control region subset.

7. The method of claim 1, wherein the method comprises:
- dedicating at least one control region subset out of the one or more control region subsets as being dedicated for transmitting DL data in the control region for the UE;
- wherein at least one of the one or more CORESETs of the UE is fully contained within the at least one dedicated control region subset; and
- wherein only PDCCH for the UE having scheduled DL data in the at least one dedicated control region subset is allocated in the at least one dedicated control region subset, across any overlapping one or more CORESETs.

8. The method of claim 7, wherein the method comprises dedicating a second Orthogonal Frequency-Division Multiplexing (OFDM) symbol out of a first and the second OFDM symbol in a timeslot as being dedicated for transmitting DL data in the control region subset.

9. The method of claim 6, wherein the transmitting comprises determining a Transport Block Size (TBS), a Modulation and Coding Scheme (MCS), and/or resource elements (REs) which the DL data shall be mapped on.

10. The method of claim 6, wherein the DL data for the UE is transmitted in the control region only.

11. A radio network node in a Radio Access Network (RAN) for scheduling downlink (DL) data for a User Equipment (UE) in a control region; wherein the UE has one or more control resource sets (CORESETs) configured in the control region in which the UE monitors for Physical Downlink Control Channel (PDCCH); the radio network node comprising:
- processing circuitry;
- memory containing instructions executable by the processing circuitry whereby the radio network node is operative to:
- determine to transmit DL data to the UE in one or more control region subsets when an amount of the DL data for the UE is less or equal to a threshold, wherein:
  - the threshold is a parameterized threshold of a number of bits;
  - defines a percentage of the total amount of bits available in the control region of a carrier; and
  - is based on available resources of the control region subset and on an estimated channel quality of the UE; and
- transmit the DL data to the UE in the control regions subset.

12. The radio network node of claim 11, wherein the threshold is further based on an estimated channel quality of the UE.

13. The radio network node of claim 12, wherein the instructions are such that the radio network node is operative to determine to transmit DL data in the control region subset when the estimated channel quality is above a level which allows a complete data package to be transmitted in the control region subset.

14. The radio network node of claim 11, wherein the instructions are such that the radio network node is operative to determine to transmit DL data to the UE in the control region subset based on a significance of the DL data to be sent to the UE.

15. The radio network node of claim 11, wherein the instructions are such that the radio network node is operative to transmit DL data to the UE in the control region subset.

16. The radio network node of claim 11:
- wherein the instructions are such that the radio network node is operative to dedicate at least one control region subset out of the one or more control region subsets as being dedicated for transmitting DL data in the control region for the UE;
- wherein at least one of the one or more CORESETs of the UE is fully contained within the at least one dedicated control region subset; and
- wherein only PDCCH for the UE for which DL data shall be transmitted in the at least one dedicated control region subset is allocated in the at least one dedicated control region subset, across any overlapping one or more CORESETs.

* * * * *